United States Patent [19]

Richmann et al.

[11] Patent Number: 5,282,997
[45] Date of Patent: Feb. 1, 1994

[54] PROCESS AND COMPOSITION FOR DEINKING DRY TONER ELECTROSTATIC PRINTED WASTEPAPER

[75] Inventors: Sandra K. Richmann, Jacksonville Beach; Mary Beth Letscher, Jacksonville, both of Fla.

[73] Assignee: Betz PaperChem, Inc., Jacksonville, Fla.

[21] Appl. No.: 893,633

[22] Filed: Jun. 5, 1992

Related U.S. Application Data

[62] Division of Ser. No. 691,210, Apr. 25, 1991, Pat. No. 5,141,598.

[51] Int. Cl.$^5$ ............................ C09D 9/00; C09D 9/04
[52] U.S. Cl. .................... 252/162; 252/170; 252/174.21; 252/174.22
[58] Field of Search ................. 252/174.21, 174.22, 252/162, 170

[56] References Cited

U.S. PATENT DOCUMENTS

| | | | |
|---|---|---|---|
| 3,501,373 | 3/1970 | Illingworth | 162/5 |
| 3,619,119 | 11/1971 | Felletschin et al. | 8/137 |
| 3,635,789 | 1/1972 | Green | 162/5 |
| 4,176,080 | 11/1979 | Wise et al. | 252/162 |
| 4,180,472 | 12/1979 | Mitchell et al. | 252/162 |
| 4,276,118 | 6/1981 | Quick | 162/5 |
| 4,438,009 | 3/1984 | Brusky et al. | 252/90 |
| 4,446,044 | 5/1984 | Rutkiewic et al. | 252/170 |
| 4,518,459 | 5/1985 | Freis et al. | 162/5 |
| 4,541,945 | 9/1985 | Anderson et al. | 252/149 |
| 4,561,933 | 12/1985 | Wood et al. | 162/5 |
| 4,588,516 | 5/1986 | Schwartz | 252/174.21 |
| 4,711,739 | 12/1987 | Kandathil | 252/139 |
| 4,820,379 | 4/1989 | Darlington | 162/5 |
| 4,909,962 | 3/1990 | Clark | 252/547 |
| 5,102,500 | 4/1992 | Darlington | 162/5 |

FOREIGN PATENT DOCUMENTS

| | | |
|---|---|---|
| 0307024 | 3/1989 | European Pat. Off. |
| 1553212 | 9/1979 | United Kingdom |

OTHER PUBLICATIONS

Darlington, W. B., "A New Process for Deinking Electrostatic-printed Secondary Fiber", *Tappi Proceedings*, 1988 Pulping Conference, pp. 95–100.

*Primary Examiner*—Paul Lieberman
*Assistant Examiner*—Michael P. Tierney
*Attorney, Agent, or Firm*—Alexander D. Ricci; Richard A. Paikoff

[57] ABSTRACT

A composition and method for deinking dry toner electrostatic printed wastepaper is disclosed. The composition comprises a combination of: (1) aliphatic petroleum distillates, (2) an alkylphenoxypoly-(ethyleneoxy) ethanol, and (3) an ethoxylated polyoxypropylene glycol.

The method comprises administering a sufficient amount of this combination to a sample of electrostatic printed wastepaper for which treatment is desired.

5 Claims, No Drawings

PROCESS AND COMPOSITION FOR DEINKING DRY TONER ELECTROSTATIC PRINTED WASTEPAPER

This is a divisional of application Ser. No. 07/691,210 filed Apr. 25, 1991 now U.S. Pat. No. 5,141,598.

BACKGROUND OF THE INVENTION

Dry toner electrostatic printing inks, including laser and xerographic inks, are important and growing contaminants in the area of waste paper recycling. Traditionally, paper has been printed with water or oil-based inks which were adequately removed by conventional deinking procedures. In these methods, secondary fiber is mechanically pulped and contacted with an aqueous medium containing a surfactant. Ink is separated from pulp fibers as a result of mechanical pulping and the action of the surfactant. The dispersed ink is separated from pulp fibers by such means as washing or flotation.

Conventional deinking processes have shown minimal success in dealing with dry toner electrostatic printing inks, with the necessary chemical and mechanical treatments of the furnish proving to be time consuming and often rendering a furnish which is unacceptable for many applications. The development of a deinking program for office waste contaminated with electrostatic printed copy will make this furnish more amenable to the recycling process.

The ability to recycle office waste will prove commercially advantageous and will have a significant impact on the conservation of virgin fiber resources. Although electrostatic printed waste has not reached the volume of impact printed waste commonly seen in the industry, indications are such that usage of electrostatic print is increasing steadily and that waste copies available to the recycling industry will also increase.

The present invention enhances the agglomeration and subsequent removal of electrostatic toner particles through centrifugal cleaners by using specific combinations of commercially available raw materials (solvents and surfactants). It is believed that this can be accomplished at a wide range of pH levels (5.0 to 11.0) and will render a furnish that is virtually free of electrostatic printing ink after subsequent mechanical treatment. The invention allows for the separation of ink particles and associated binder from pulp fibers, and causes the particles to agglomerate to a critical range of size and density, which affords their most efficient removal from the pulp slurry by centrifugal cleaners.

The present invention demonstrates that a combination of solvents and surfactants with low HLBs enhance the agglomeration of electrostatic toner particles, allowing removal through centrifugal cleaning and/or screening. HLB is an abbreviation for hydrophile-lipophile balance as related to the oil and water solubility of a material. A high HLB indicates that the hydrophilic portion of the molecule is dominant, while a low HLB indicates that the hydrophobic portion of the molecule is dominant. The water solubility of materials increases with increasing HLB. Traditional deinking processes utilize a wide variety of high HLB (generally greater than 10) nonionic and/or anionic surfactants or dispersants to wet and disperse ink particles to a range of size (about 0.5 to 15 microns) which allows for their most efficient subsequent removal by washing and/or froth flotation processes.

Agglomeration is anticipated to be seen at pH levels ranging from 5.0 to 11.0, with no significant deposition of ink expected to be present on pulping equipment. The advantage of this formulation is that it allows for agglomeration at an ambient pH, alleviating the need for caustic or acid tanks in the mill environment.

SUMMARY OF THE INVENTION

The components of the present invention comprise (1) aliphatic petroleum distillates (solvent), (2) an alkylphenoxypoly-(ethyleneoxy) ethanol (surfactant) and (3) an ethoxylated polyoxypropylene glycol (surfactant). All components are commercially available.

DETAILED DESCRIPTION OF THE INVENTION

The present inventors have discovered that the addition of a specific solvent/surfactant blend to the pulper significantly enhances the agglomeration of electrostatic toner particles, allowing for their separation from fiber through centrifugal cleaning and/or screening. This agglomeration is anticipated to be seen at pH levels ranging from 5.0 to 11.0, with no significant deposition of ink expected to be present on pulping equipment. (A pH higher than 11.0 or lower than 5.0 is also believed to be effective). The formulation allows for agglomeration at an ambient pH, alleviating the need for caustic or acid tanks in the mill environment.

The aliphatic petroleum distillates (A) are saturated hydrocarbons having carbon numbers in the range of C9-C12. The chemical structures of the remaining raw materials are as follows:

Alkylphenoxypoly-(ethyleneoxy) ethanol
$C_xH_{2x+1}-C_6H_4O-(CH_2CH_2O)_nH$
n = 1-6
x = 8-12

Ethoxylated Polyoxypropylene Glycol $$HOCH_2CH_2(CH_2CH_2O)_n(CH_2\underset{\underset{CH_3}{|}}{C}HO)_m(CH_2CH_2O)_nCH_2CH_2OH$$

n = 1-45
m = 14-77

For the application of electrostatic toner particle agglomeration, the effective hydrophile - lipophile balance of the tested surfactants is less than or equal to 10. It is believed that the effective temperature range for the agglomeration of electrostatic toner particles is from 110°-190° F.

A beaker test method was utilized to determine the impact of various raw materials on toner agglomeration without the presence of fiber. This method allowed for the visual evaluation of toner configuration after treatment and permitted the particles to be sized using the Brinkmann Particle Size Analyzer. When raw materials were screened using this method, those demonstrating significant particle agglomeration were advanced to the Deinking/Repulping Apparatus (the pulper) for an evaluation of performance in the presence of fiber.

The experimental procedure was as follows: Approximately 0.01 grams of toner was added to a beaker containing 100 milliliters of deionized water. Each solution of toner and water was mixed on a magnetic stirrer at a pH of 7.0, a temperature of 150° F. and a contact time of 60 minutes. About 514 parts of raw material or experimental product per million parts of solution was added to the beaker. Upon completion of contact time, particle configurations were noted, and solution were filtered and held for size evaluation using the Brinkmann Particle Size Analyzer.

The pulper was then used to evaluate selected raw materials. This apparatus consists of a Waring blender jar with the blades reversed to provide a mixing action of the fibers. The stirring of the blender is controlled by a motor connected to a Servodyne controller. Temperature of the pulp in the blender is provided by a heating mat attached to a temperature controller. The typical furnish consistency in the laboratory pulper is 5%, and a stirring speed of 750 rpm is used to simulate the mechanical action of a hydropulper.

Electrostatic printed wood-free fiber was used as the furnish. Twenty pounds of raw material or experimental product per ton of fiber were added to the pulper, at a temperature of 150° F., a pH of 7.0, and a pulping time of 60 minutes.

DESCRIPTION OF THE PREFERRED EMBODIMENT

The laboratory results found in Table I demonstrate the effectiveness of the present invention. A nonylphenoxypoly(ethylineoxy) ethanol with a molecular weight of 286 and an ethoxylated polyoxypropylene glycol with a molecular weight of 3800 are preferred components.

TABLE 1

Pulper Results at 150° F., pH 7.0, 60 Minute Pulping Time

| Condition | HLB of Material | Minimum Particle Size (Microns) |
|---|---|---|
| Untreated Control | 0 | 1-2 |
| 20 lbs/ton Nonylphenoxypoly-(ethyleneoxy) ethanol (Mol. Wt. 748, n = 12) | 14.2 | 4.5 |
| 20 lbs/ton Nonylphenoxypoly-(ethyleneoxy) ethanol (Mol. Wt. 396, n = 4) | 8.8 | 10.0 |
| 20 lbs/ton Nonylphenoxypoly-(ethyleneoxy) ethanol (B, Mol. Wt. = 286, n = 1.5) | 4.6 | 15.0 |
| 20 lbs/ton Ethoxylated Polyoxypropylene Glycol (C, Mol. Wt. = 3800) | 1.0 | 18.0 |
| 20 lbs/ton Formulation (60% A: 10% B: 30% C) | * | 40.0 |

*An HLB cannot be accurately calculated for a blended formulation.
Note the effectiveness of each material (e.g., B and C) in increasing laser ink particle size, as compared to the untreated control. However, the experimental formulation in its preferred ratios (60% A/ 10% B/ 30% C) showed a significant increase in particle size as compared to individual components.

The effective ratio range of each of the raw materials in the formulation is believed to be:
10-60% Aliphatic Petroleum Distillates
10-89% Alkylphenoxypoly-(ethyleneoxy) ethanol
1-80% Ethoxylated Polyoxypropylene Glycol While this invention has been described with respect to particular embodiments thereof, it is apparent that numerous other forms and modifications of this invention will be obvious to those skilled in the art. The appended claims and this invention generally should be construed to cover all such obvious forms and modifications which are within the true spirit and scope of the present invention.

We claim:

1. A composition for enhancing the agglomeration of electrostatic toner particles in the deinking of electrostatic printed wastepaper, said composition comprising a combination of (a) about 10-60% of aliphatic petroleum distillates, said aliphatic petroleum distillates being saturated hydrocarbons having carbon numbers in the range of C9-C12, (b) about 10-89% of an alkylphenoxypoly(ethyleneoxy) ethanol and (c) about 1-80% of an ethoxylated polyoxypropylene glycol, the hydrophile/lipophile balance of both (b) and (c) being less than or equal to 10.0.

2. The composition as recited in claim 11 wherein the alkylphenoxypoly-(ethyleneoxy) ethanol is a compound of the formula $$C_9H_{19}-C_6H_4O(CH_2CH_2O)_nH$$

with n from 1 to 5.

3. The composition as recited in claim 11 wherein the ethoxylated polyoxypropylene glycol is a compound of the formula $$HOCH_2CH_2(CH_2CH_2O)_n(CH_2\overset{\underset{\mid}{CH_3}}{C}HO)_m(CH_2CH_2O)_nCH_2CH_2OH$$

with n from about 1 to 45 and m from about 14 to 77.

4. The composition as recited in claim 1 wherein the weight ratio of (a):(b):(c) is about 6:1:3.

5. The composition as recited in claim 11 wherein the alkylphenoxypoly-(ethyleneoxy) ethanol is a compound of the formula $$C_9H_{19}-C_6H_4O(CH_2CH_2O)_nH$$

with n from 1 to 5, and the ethoxylated polyoxypropylene glycol is a compound of the formula $$HOCH_2CH_2(CH_2CH_2O)_n(CH_2\overset{\underset{\mid}{CH_3}}{C}HO)_m(CH_2CH_2O)_nCH_2CH_2OH$$

with n from about 1 to 45 and m from about 14 to 77.

* * * * *